United States Patent [19]
Gould et al.

[11] Patent Number: 5,822,845
[45] Date of Patent: Oct. 20, 1998

[54] METHOD OF RETAINING A WINDING ELEMENT IN A STATOR SLOT

[75] Inventors: Gary Michael Gould; Piero Vittorio Ronca, both of Peterborough, Canada

[73] Assignee: General Electric Canada Inc., Mississauga, Canada

[21] Appl. No.: 825,900

[22] Filed: Apr. 2, 1997

Related U.S. Application Data

[62] Division of Ser. No. 627,103, Apr. 3, 1996, Pat. No. 5,708,315.

[51] Int. Cl.$^6$ .................................................... H02K 15/06
[52] U.S. Cl. ............................... 29/596; 29/451; 29/452
[58] Field of Search ............................. 29/596, 598, 451, 29/452; 310/42, 214, 215

[56] References Cited

U.S. PATENT DOCUMENTS 5,341,501   8/1994   Schorm et al. .......................... 29/596

Primary Examiner—Carl E. Hall
Attorney, Agent, or Firm—Edward H. Oldham

[57] ABSTRACT

Stator bars and stator coils (winding elements) for a large dynamoelectric machine which are to be permanently placed in the slots of the magnetic core of the machine are wrapped so as to be surrounded on three sides with an elongated sheet of an elastomeric substance. A stretching device is attached to the two overlapping edges of the elastomeric sheet in such a manner as to be able to stretch the sheet around the winding element and thus reduce the thickness of the elastomer. The winding element surrounded by the stretched layer of the elastomeric substance is placed in a selected stator slot and the stretching device is detached from the elastomeric material. The elastomeric material attempts to regain its former thickness but is confined to the remaining space between the winding element and the sides of the slot. The offal is trimmed from the elastomeric substance and the winding element remains lodged in the slot.

8 Claims, 2 Drawing Sheets

METHOD OF RETAINING A WINDING ELEMENT IN A STATOR SLOT

This application is a divisional application of U.S. application Ser. No. 08/627,103 filed in the United States Patent Office on Apr. 3, 1996, now U.S. Pat. No. 5,708,315.

In large dynamoelectric machines, the magnetic structure is usually made up of punchings which are stacked so as to produce a magnetic stator core body having a central bore. The magnetic core body also defines a series of evenly spaced radially extending core slots opening into the bore. A series of insulated winding elements i.e. stator bars or stator coils, having a generally rectangular cross section, are disposed in the provided core slots, and are generally electrically connected at their ends in a predetermined arrangement to form the winding which produces the magnetic field in the magnetic core structure.

There are usually two winding elements disposed in a single core slot, and there may be only one winding element or there may be more than two winding elements in a single core slot in special circumstances. The winding elements are stacked one above the other in the slots provided and each set of winding elements so disposed are generally held in place in the slots by means of longitudinal wedge members which are driven into longitudinal dovetail grooves provided near the top of each slot, in each side of the slots, just adjacent the stator bore. This method of wedging the previously placed winding elements in the stator has been standard practice for many years and has for the most part produced satisfactory results.

Winding elements may be held in the magnetic slots by the presence of insulating material applied to the magnetic structure during a standard vacuum impregnation process. At times, insulating shim members are pressed into the space between the winding element and the slot wall; sometimes wavy springs are also inserted into the sidewall space between the winding element and the slot wall to secure the winding element in the lot. Nevertheless, a slot wedge is universally used to assure the final position of the winding element in the slot, regardless of the presence of other materials which may have been introduced in the space between the winding element and the wall of the magnetic slot in the manufacture of the dynamoelectric machine.

It will be understood by those skilled in the art that the construction of a magnetic core involves the placing of pre-stamped punchings in a predetermined well known manner to form a monolithic magnetic structure.

The stator lamination punchings must be carefully stacked during the assembly of the magnetic core, and despite efforts to produce a perfectly stacked magnetic body, in most instances the assembly procedures employed during the stacking operation lead to the production of a completed assembly where the punchings are slightly misaligned so that the winding slot that results in the finished magnetic core has less width than the width of the individual slot in a single punching. The variance though very slight nevertheless exists. In addition to the slight variance in the slots, it will be found that the winding elements which are ultimately placed in the slots of the magnetic core will be found to have slight variations in the external dimensions due to imperfect manufacturing techniques, which may be caused by uneven thickness of the insulation applied to the winding elements, thus, machine manufacturer must allow for tolerances in both the slot width and the imperfect winding element width, thus a perfect fit between the winding elements and the slots in which they are disposed is seldom achieved. Those skilled in the art will recognize that an interference fit must be designed into the system in order that the winding elements may be inserted into the stator slots and retained in the slots without suffering damage to the groundwall insulation during the insertion process.

If for instance, the rotor of a dynamoelectric machine is producing a magnetic field in the stator of the dynamoelectric machine, electromagnetic forces are set up in the winding elements of the stator which tend to cause the winding elements to vibrate in the slots in a radial and axial direction. This vibration produces wear on the insulation surfaces on the sides of the winding elements, as well on the surfaces exposed to the wedging system. This may also lead to the production of added noise in the operation of the machine. Prior art efforts to improve the performance of dynamoelectric machines by applying some kind of radial restraint to the bars, have not been entirely satisfactory as the discussion of prior art references following will show.

The objects of this invention are to provide an improved arrangement for securing stator winding elements in the slots of the magnetic structure of the machine in which they are disposed, so as to decrease the incidence of wear on the insulation surfaces of the stator bars caused by the vibration produced in the stator bars by the alternating magnetic field. The mounting arrangement will effectively dampen the vibration of the stator bars in the stator slots of the laminated stator core in both the radial and the axial direction.

At the same time, the noise generated by the vibration of the stator bars in their respective stator slots is substantially reduced because of the reduced vibration of the stator bars.

Additionally, this invention seeks to improve the heat flow from the stator bars to the surrounding magnetic material forming the stator slots.

It is a primary object of this invention to produce an electrically conductive ground plane in the space between the winding elements of a dynamoelectric machine and the slots in the machine in which the element is located so as to eliminate slot discharges in the spaces which may occur between the winding elements and the magnetic slots of prior art machines. This invention is especially important in the elimination of electrical discharges in the magnetic slots in high voltage machines.

BACKGROUND OF THE INVENTION

U.S. Pat. No. 3,155,770 to Coggeshall et al provides a coil dampening arrangement for AC dynamoelectric machines wherein "ripple springs" are provided to produce side wise or transverse biasing forces on the sides of the magnetic core slot and the sides of each winding elements disposed in the slots. Motion of the winding elements is said to be reduced by this method of applying pressure to specific areas of the winding elements by the wavy spring action.

This reference requires that the side ripple springs be non-magnetic and are usually a glass fiber material or stainless steel. Installation of the ripple springs requires time and ultimate placement is important, Coggeshall does not rely on total intimate contact between the magnetic core slot and the winding element to provide cooling of the stator bars; a cooling gas is ducted through the stator and arranged to circulate through the crevices where the ripple springs are placed.

U.S. Pat. No. 3,393,335 to Pletenik et al seeks to prevent the vibration of winding elements in the slots of dynamoelectric machines. Pletenik uses an elastomeric substance inserted between the slot wedges and the winding element to apply pressure on the winding element so as to prevent motion of the winding element in the machine slot.

U.S. Pat. No. 3,943,392 to Keuper et al provides a U-shaped slot liner of an insulating material which have spongy ribs extending along the length of the liner. These ribs absorb a thermosetting resin at a time when the winding elements have been inserted in the machine slots to effectively "lock" the winding elements and liners in the machine slot.

U.S. Pat. No. 4,369,389 to Lambrecht utilizes wavy springs under the slot wedge and adjacent winding elements to effectively apply constant pressure on the winding element to keep it in place in the slot of the machine.

U.S. Pat. No. 5,365,135 to Konrad et al uses a conformable hose filled with a resinous liquid under pressure which is located between the slot wedges and the winding element which when pressurized and cured, provides a constant force to hold the winding elements in place.

Paper CH1717 15th EIC Insulation Conference, Chicago, Ill. Oct. 19–22, 1981 by Hyndman et al describes the problems faced by electrical designers of AC dynamoelectric machines with the advent of stator bars insulated with a thermoset resin based micaceous ground insulation, in which stator bar movement, looseness and other vibrations become a reality. Another electrical phenomenon (i.e. spark erosion) is also discussed.

The solution provided by the above paper is the application of a layer of electrically conductive and insulating room temperature vulcanizing material to the sides of winding elements being inserted into the magnetic slots of the dynamoelectic machines. Generally the material is a silicone rubber compound which is made to be of an insulating nature at the top of the winding element in the slot, but is made to be conductive in the lower portions of the winding elements in the slots. This produces an equipotential surface so as to eliminate the troublesome slot discharges which had occurred with previous insulation systems. See also Canadian Patent 1,016,586—Aug. 30, 1977.

It is therefore concluded that the problem of stabilizing winding elements in the slots of dynamoelectric machines is an ongoing one which has been attacked from many directions with various degrees of success. The prior art solutions have at times required tedious and laborious tasks of inserting wavy springs into the crevices between the winding elements and the slots. Ideally if a perfect winding element with precise dimensions could be manufactured, and inserted into a perfectly manufactured and aligned magnetic core slot with a predetermined degree of interference in the fit between the two, the ultimate desire of the machine manufacturer would be achieved.

The machine designer must ultimately deal with the problem of the different rates of thermal expansion which occur for the winding elements and the magnetic core material which houses the winding elements. The relative motion which results due to differing thermal expansion rates and electromagnetic forces leads to a condition commonly referred to as "fretting".

SUMMARY OF THE INVENTION

It is to overcome the imperfections as set out above that this invention finds its application. An elastomeric sheet is lapped over and along the length of the winding element which is to be inserted in a stator slot of a large AC dynamoelectric machine. In one mode of this invention a stretching device is attached to the elastomeric sheet and the winding element so that the elastomeric sheet is stretched around the two sides and the bottom of the winding element by the stretching device so as to effectively temporarily reduce the wall thickness of the elastomeric sheet.

With the stretching device still attached to the winding element, the combined winding element which is covered on three sides by the stretched elastomeric sheet is inserted into the machine slot. The stretching device is now uncoupled from the elastomeric sheet and the sheet attempts to return to its former thickness but now is constrained to the space remaining between the winding element and the slot wall. The elastomer sheet is now trimmed and the offal is discarded.

If a second winding element is to be inserted above the previously inserted winding element, the same process is repeated. Upon trimming the offal, an appropriate slot wedge is inserted to lock the winding element(s) in place in the slot.

The elastomeric material may be loaded with a heat conductive substance to improve the heat transfer from the winding element to the steel structure surrounding the slot, the important feature being that the elasticity of the elastomeric member must not be impaired. It is also important that the addition of the heat transfer medium to the elastomeric material does not shorten or interfere with the life or mechanical properties of the elastomeric material. For higher voltage applications, the material added to the elastomer material may include conductive particles to reduce the resistivity of the elastomeric material, and if the particles are such as to increase the thermal conductivity across the thickness of the elastomeric material, the overall function of the elastomeric material is enhanced beyond a simple winding element securing device. It is also important that the compression set of the elastomeric material is not increased by the addition of the particulate material added to the elastomeric material.

Another mode of this invention is to provide a winding element which may have the elastomeric material in contact with one, two, or three sides of the winding element. The elastomeric material is and stretched longitudinally along the length of the slot which the winding element is to be inserted until the desired reduction of the thickness of the elastomeric material is achieved. The winding element is inserted into the magnetic core slot where the stretched elastomeric strip is located and the tension is removed from the elastomeric material so as to allow the elastomeric material to increase in thickness to fill the gap between the winding element and the slot wall and "set" the winding element in the slot. It will be apparent to those skilled in the art that the elastomeric material may be applied to only one side of the winding element or to all three sides, or two opposing sides, and the elastomeric material may not be required to be trimmed in the slot portions, but only at the end of the stator core where the winding ends protrude.

BRIEF DESCRIPTION OF THE DRAWINGS

FIG. 5 shows an alternative form of this invention.

DETAILED DESCRIPTION OF THE EMBODIMENTS

Figure 1:
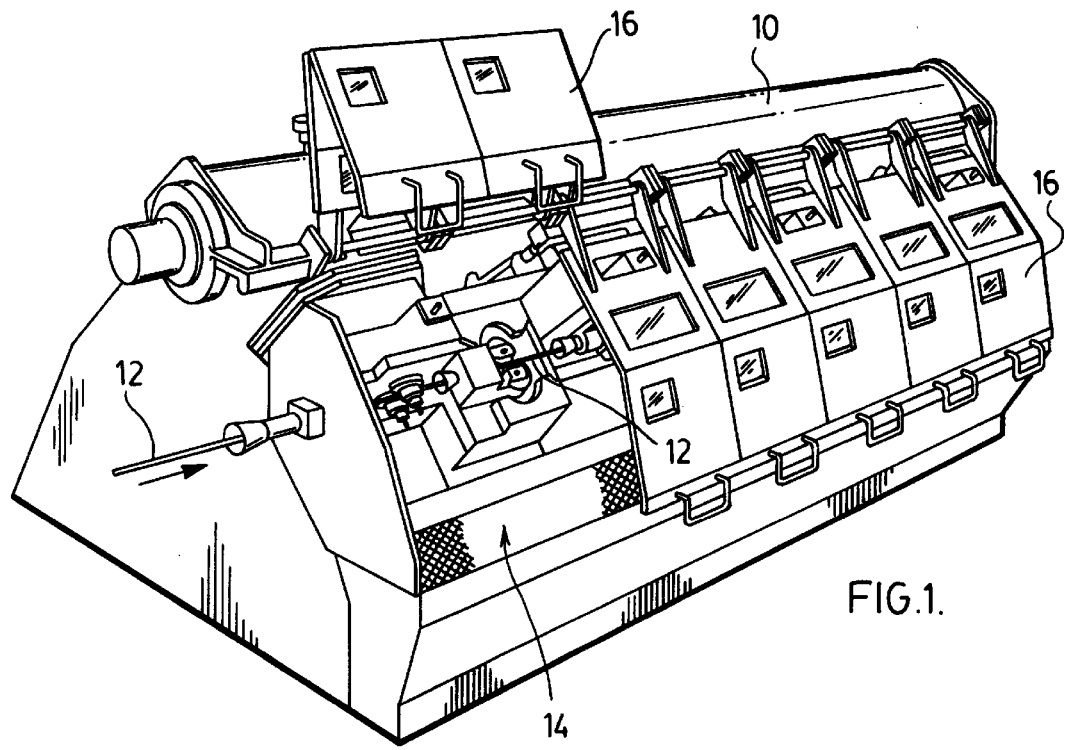
FIG. 1 illustrates a perspective view of a stator bar for insertion into a stator slot of a large dynamoelectric machine.

Referring now to the drawings and to FIG. 1 in particular, where a stator bar 10 is shown which is ready to be installed into the stator of a large dynamoelectric machine. Stator bar 10 is composed of many conductors which are suitably insulated from each other by means of a suitable insulating medium. The stator bar has a heavy groundwall insulation on the exterior thereof to provide suitable electrical isolation between the conductors and the ground plane of the slot in which the stator bar 10 is to be installed. Bar 10 has a pair of barred ends 12 and 14 for connection to other electrical conductors once bar 10 is installed in a stator core.

Although bar 10 is composed of many individual conductors and insulating tape, etc. the end product is a very rigid solid member having a hard outer surface 16.

Figure 2:
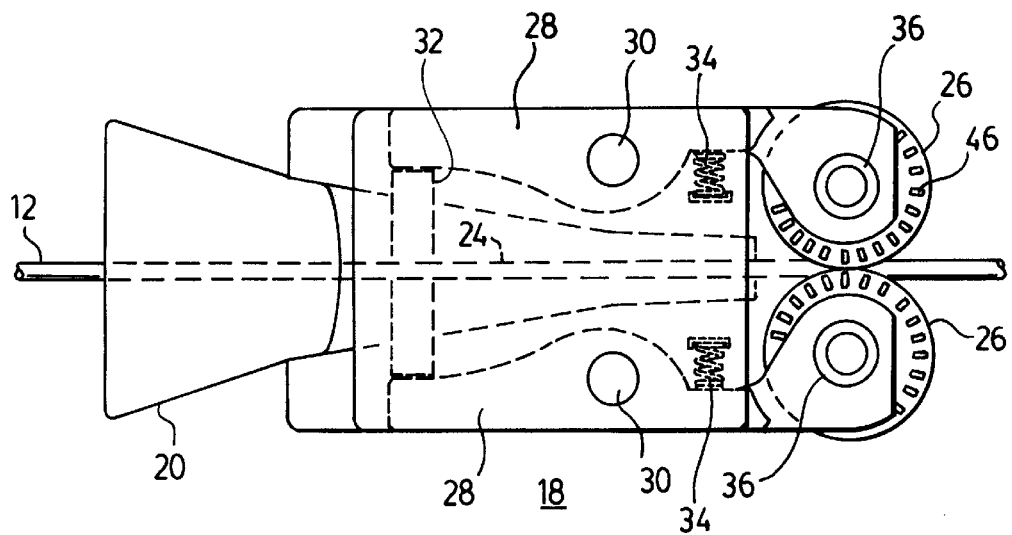
FIG. 2 is a perspective view of a section of the stator of a large dynamoelectric machine.

FIG. 2 illustrates a stator core 50 comprising many steel punchings which are stacked together to form a generally cylindraceous body having a cylindrical bore in the interior thereof. On the interior bore surface are a plurality of radial slots 52 extending longitudinally in an axial direction the entire length of the stator 50. Slots 52 are of such a width that stator bar would normally require a pressing device to push the stator bar into the empty stator slot in order to overcome the insertion resistance caused by the interference fit of the stator bar with the stator slot.

Figure 3:
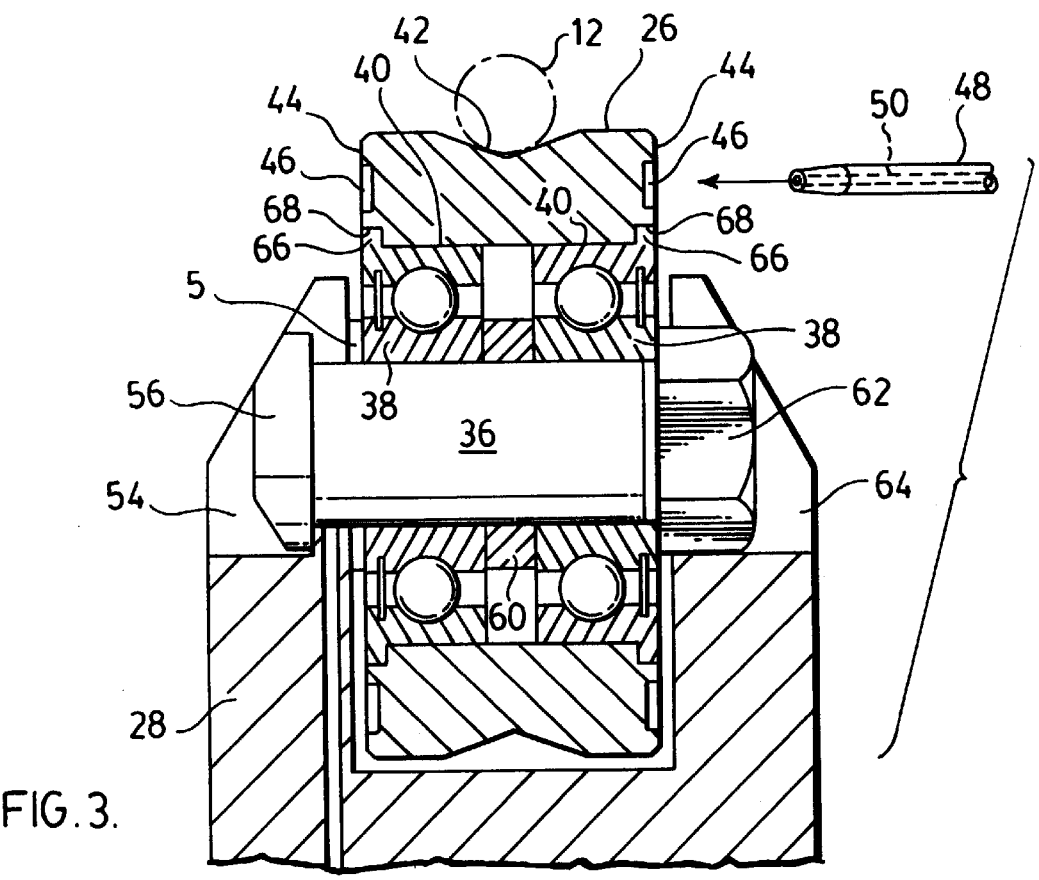
FIG. 3 is a perspective view of the device of this invention.

FIG. 3 shows the device 60 of this invention. Basically, the stretching device 60 comprises an elongated flat base member 62 which has a V shaped groove 64 extending the length of member 62. Member 62 is preferably an elongated flat member about which is made to about the same length as the slot portion of the stator bars to be used with device 60. Hingedly attached to member 62 is another elongated flat member 66. In this instance, the members are hingedly attached by means by hinge 68. Member 66 is made to cooperate with member 62 in that member 66 is of about the same length as member 62 and the member 66 has a V-shaped protruding ridge 68 which fits into V-shaped groove 64 when the member 62 and 66 are closed. Devices 70 are used to close and lock members 62 and 66 in a closed pressing position. In this instance, the closing devices are threaded fasteners, however any clamping device which will press the two co-operating members 64 and 66 together will fulfil the requirements of device 60.

At each end of member 62 are a pair of bosses 72 and 74 to which have threaded bores therein having a pair threaded hand screws 76 and 78 threadedly received therein. Each hand screw is provided with a handle, 80 and 82 and a U-shaped end 84 and 86 having openings 88 and 90 of such size as to receive a stator bar therein such as the bar illustrated as 10 in FIG. 1. The openings 88 and 90 are of such width so as to be able to comfortably slide over the bar 10 with no excessive slop.

Figure 4:
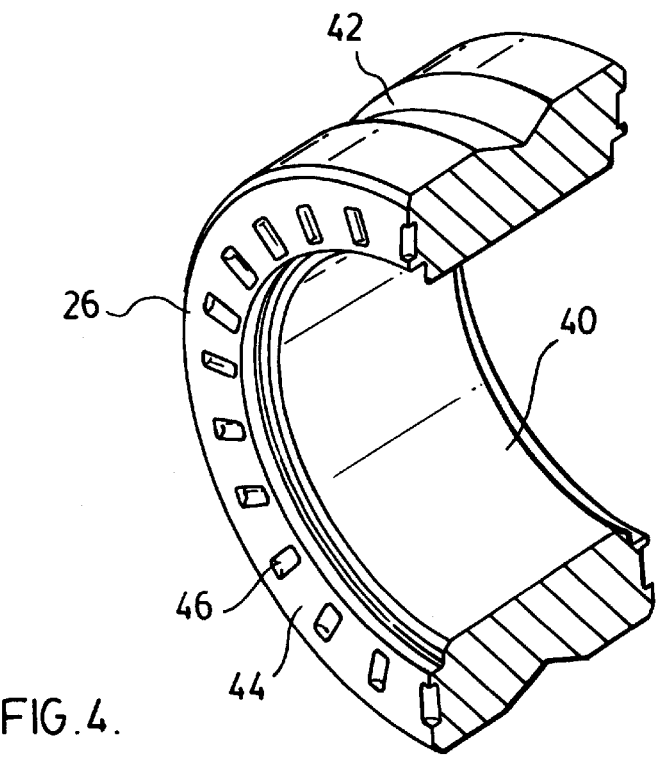
FIG. 4 shows the device of this invention being applied to a stator bar.

FIG. 4 shows the device 60 of FIG. 3 in a partial perspective having an elastomeric membrane 100 received between members 64 and 68 with member 84 and 86 straddling the ends of bar 10, the membrane 100 is wrapped around the stator bar 10 for the entire length of the stator slots such as 52 of FIG. 2. When membrane has been wrapped around the stator bar 10 so that both sides 102 and 104 are securely and evenly clamped in device 60, the tightening devices 70 are advanced to securely clamp the sides 102 and 104 of membrane 100 between members 62 and 66 of device 60. The V groove 64 in member 62 co-operates with the projecting ridge 68 to secure the membrane prior to the stretching operation.

The hand screws 76 and 78 are advanced to stretch the membrane by extending the U-shaped brackets 84 and 86 away from members 62 and 66. When the membrane 100 is stretched sufficiently, the membrane encased bar 10 may be inserted into a slot such as 52 of FIG. 2. The bar encased membrane may be precisely located and the hand screws 76 and 78 retracted to relax membrane 100. As the elastomeric membrane attempts to return to its original thickness the space between the bar 10 and slot 52 will prevent the membrane from expanding to its original thickness. The device 60 may be opened and removed from the bar 10. The membrane may be trimmed of its offal, and the bar 10 is now firmly gripped in slot 52 by expansion of thickness of membrane 100.

FIG. 5 shows an alternative form of the invention when it is desired to have the winding element secured in the stator slot by only one or two individual strips of elastomeric material. In the example shown, the apparatus is used to insert the winding element into the magnetic core with only a single stretched elastomeric member present.

A magnetic core member 50 is shown having slots 52 of which one is shown. A stretching device 150 is fixed to the end of the magnetic core 50 by any convenient means, in this instance, by magnetic attraction. Base 152 is placed against core 50 so that slot 50 lies in gap 154 of member 150. An elastomeric strip 156 is wound around shaft 158 of device 150. Shaft 158 is journalled in bearings 160 and 162 of the stretching device 150. Shaft 158 extends below bearing 162 and a hand pulley 164 is mounted on shaft 158 for twisting shaft 158 to wind elastomeric strip 156 about shaft 158. In this manner, the strip 156 is stretched in slot 52. A device similar to device 150 is fastened to the other end of magnetic core 50 at the opposite end of slot 52. Both devices may have the hand wheels 164 twisted to stretch the elastomeric strip the length of the slot 52.

A stator winding element, in this instance a stator bar 16, may now be inserted in slot 52 of magnetic core 50. When the winding element is located in the slot 52 in the desired location, the locking device 168 is removed from its aperture 170 in wheel 164. The strip is then allowed to relax as shaft 158 unwinds the end of the strip 156 and the thickness of strip 156 increases to fill the space in the magnetic slot between the winding element 16 and the slot wall. The ends of the relaxed strip are trimmed of offal when the devices 150 are removed from core member 50. The devices 50 are then mounted on core 50 at the next available slot, and the next elastomeric strip is stretched along the slot.

Membranes 100 and 156 may be composed by any temperature or chemically stabilized elastomer which is stretchable to reduce its thickness but which has a memory which attempts to have the membrane return to its original thickness when the stretching stress is removed. The membrane 100 may be loaded with a variety of finely divided materials such as carbon, metallic or other inorganic particles to improve its electrical and heat conductivity. Other insulating materials such as silicon nitride, aluminum oxide or boron nitride may be used to improve the heat transfer capability of the membrane while improving its heat transfer characteristics and providing corona partial discharge resistance. The only requirement is that membrane 100 must retain a memory so that when the stretching stress is removed the membrane actively attempts to achieve its original thickness.

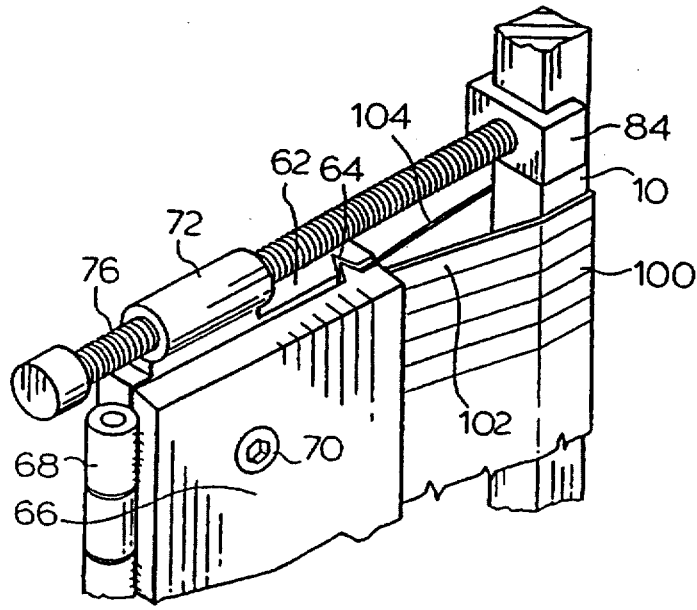

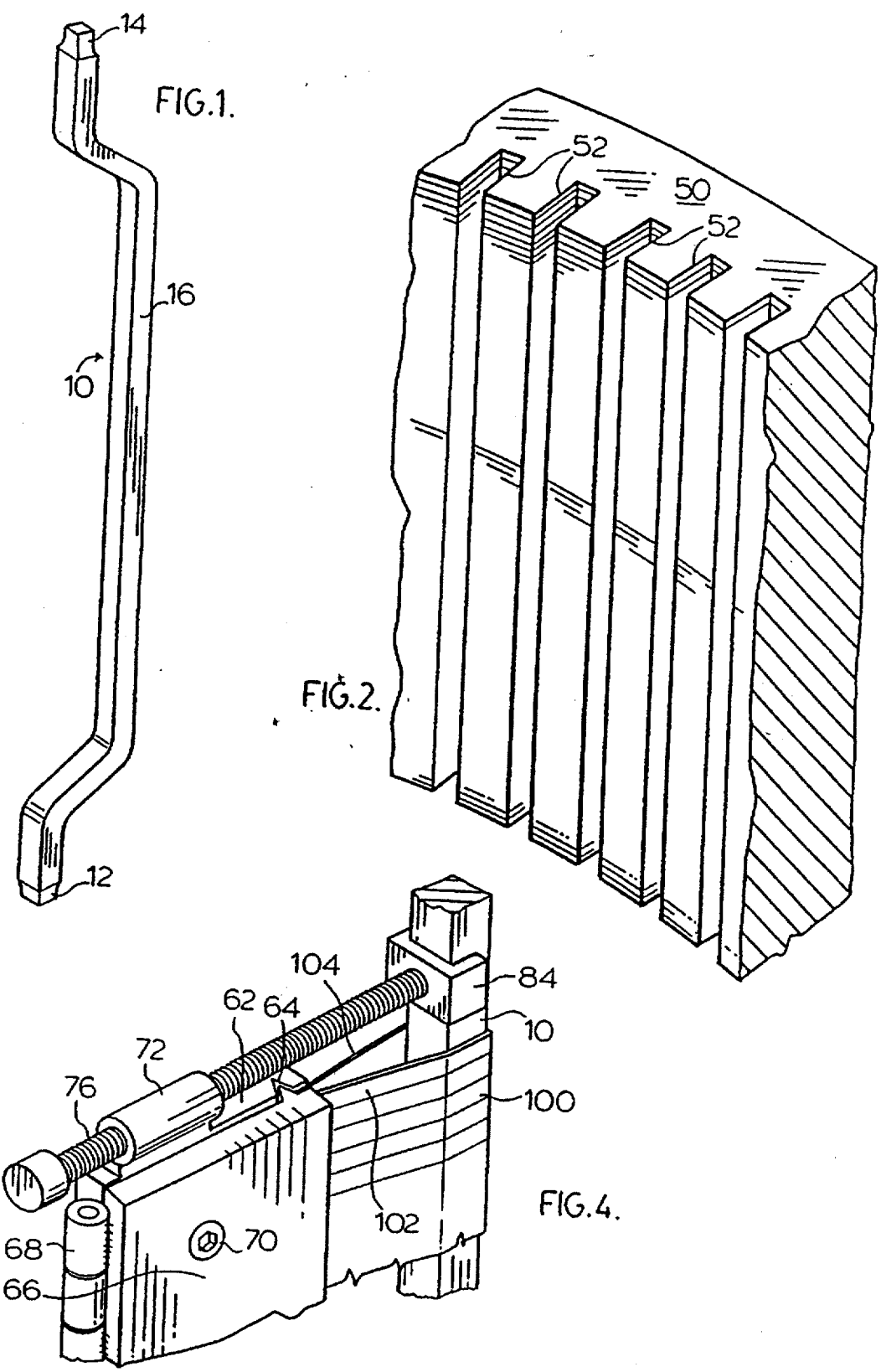

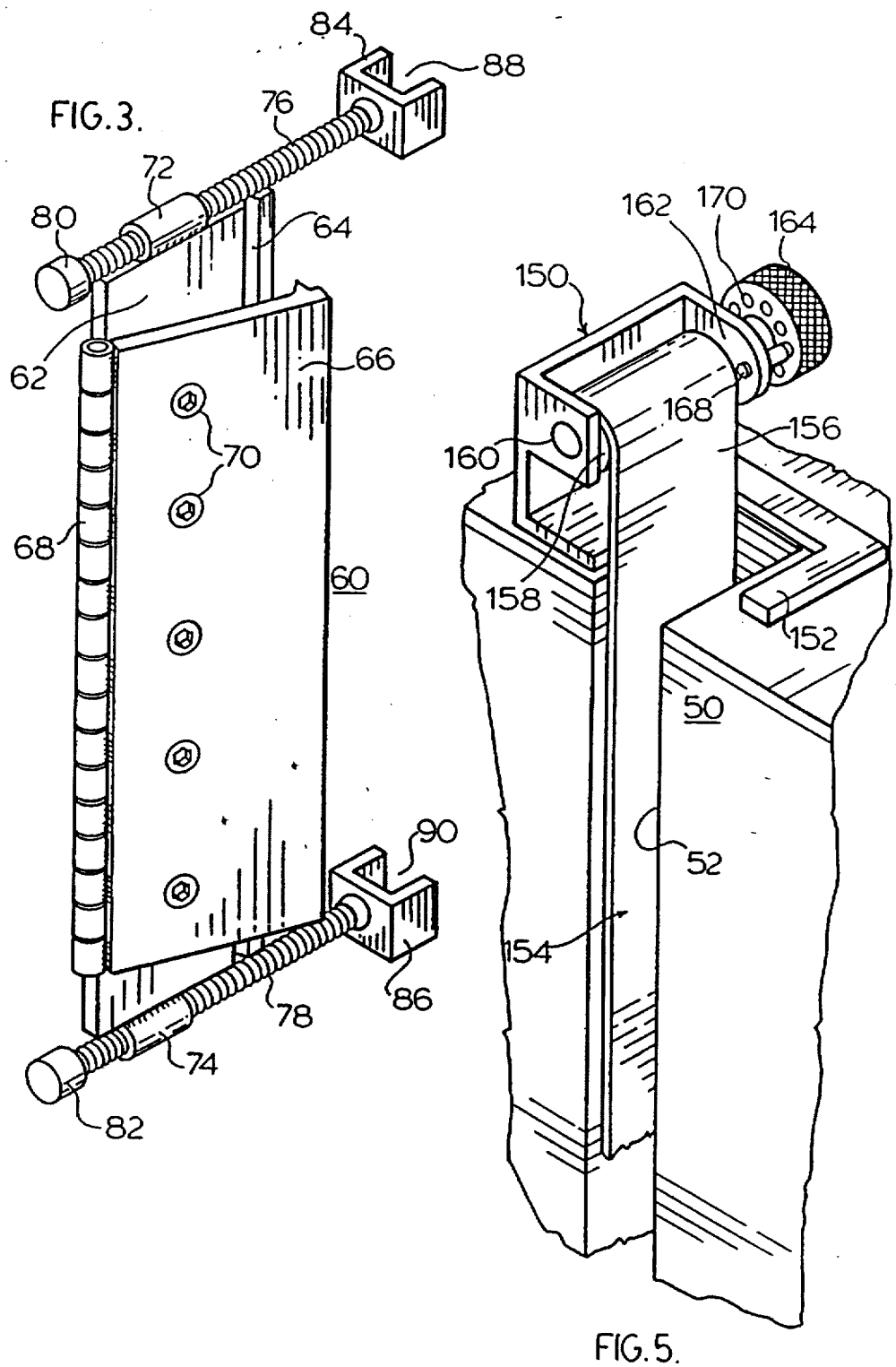

We claim:

1. A method of retaining a winding element in the slot of the stator of a large dynamoelectric machine comprising:

placing an elastomeric material over said winding element such that the elastomeric material extends along the slot portion of said winding element and envelops three surfaces of the winding element along the length thereof, and applying a stretching force to said elastomeric material to stretch the elastomeric material sufficiently to reduce the thickness of said elastomeric material surrounding the three sides of said winding element, and inserting the winding element and the stretched elastomeric material into the stator slot of said machine, and removing the stretching force from said elastomeric material and allowing the elastomeric material to relax in the slot space and expand in width to retain the winding element in said slot.

2. A method as claimed in claim 1 wherein the stretching force is applied transversely to the length of said stator bar.

3. A method as claimed in claim 2 wherein the elastomeric material contains finely divided particles of a heat conductive material.

4. A method as claimed in claim 3 wherein said particles are also electrically conductive.

5. A method of retaining a winding element in the slot of a magnetic core of a large dynamoelectric machine comprising:

placing at least one sheet of a suitable stretchable elastomeric membrane against at least one surface of said winding element, and applying a stretching force to said membrane to reduce the thickness of said membrane, whilst keeping the stretched membrane in contact with said surface, and inserting said winding element and said contacting stretched membrane in said slot, and releasing said stretching force on said membrane to permit said membrane to assume a relaxed state so as to expand and increase in thickness to retain said winding element in said slot.

6. A method as claimed in claim 5 wherein the force is applied axially along the length of said winding element.

7. A method as claimed in claim 6 wherein a pair of elastomeric sheets are placed against opposing surfaces of said winding element and stretched to reduce the thickness of said sheets, and placing the winding element and said stretched sheets in said slot, and releasing said stretching force to permit said sheets to relax and increase in thickness to retain said winding element in said slot.

8. A method as claimed in claims 5, 6 or 7 wherein the membrane is loaded with particles of a conductive material.

\* \* \* \* \*

UNITED STATES PATENT AND TRADEMARK OFFICE
CERTIFICATE OF CORRECTION

PATENT : 5,822,845

DATED : October 20, 1998

INVENTOR(S) : Gary Michael Gould, et al

It is certified that error appears in the above-identified patent and that said Letters Patent is hereby corrected as shown below:

The title page, showing the illustrative figure should be deleted to be substituted with the attached title page.

In the drawings, Figures 1-5 should be deleted to be substituted with the corrected drawing Figures 1-5, as shown on the attached pages.

Signed and Sealed this

Sixteenth Day of March, 1999

Attest:

Q. TODD DICKINSON

*Attesting Officer*  *Acting Commissioner of Patents and Trademarks*

United States Patent [19]
Gould et al.

[11] Patent Number: 5,822,845
[45] Date of Patent: Oct. 20, 1998

[54] METHOD OF RETAINING A WINDING ELEMENT IN A STATOR SLOT

[75] Inventors: Gary Michael Gould; Piero Vittorio Ronca, both of Peterborough, Canada

[73] Assignee: General Electric Canada Inc., Mississauga, Canada

[21] Appl. No.: 825,900

[22] Filed: Apr. 2, 1997

Related U.S. Application Data

[62] Division of Ser. No. 627,103, Apr. 3, 1996, Pat. No. 5,708,315.

[51] Int. Cl.⁶ .................................................. H02K 15/06
[52] U.S. Cl. .............................. 29/596; 29/451; 29/452
[58] Field of Search ........................... 29/596, 598, 451, 29/452; 310/42, 214, 215

[56] References Cited

U.S. PATENT DOCUMENTS 5,341,501  8/1994  Schorm et al. ........................... 29/596

*Primary Examiner*—Carl E. Hall
*Attorney, Agent, or Firm*—Edward H. Oldham

[57] ABSTRACT

Stator bars and stator coils (winding elements) for a large dynamoelectric machine which are to be permanently placed in the slots of the magnetic core of the machine are wrapped so as to be surrounded on three sides with an elongated sheet of an elastomeric substance. A stretching device is attached to the two overlapping edges of the elastomeric sheet in such a manner as to be able to stretch the sheet around the winding element and thus reduce the thickness of the elastomer. The winding element surrounded by the stretched layer of the elastomeric substance is placed in a selected stator slot and the stretching device is detached from the elastomeric material. The elastomeric material attempts to regain its former thickness but is confined to the remaining space between the winding element and the sides of the slot. The offal is trimmed from the elastomeric substance and the winding element remains lodged in the slot.

8 Claims, 2 Drawing Sheets